(12) United States Patent
Wu et al.

(10) Patent No.: US 12,147,342 B2
(45) Date of Patent: *Nov. 19, 2024

(54) COST-EFFECTIVE SOLID STATE DISK DATA-PROTECTION METHOD FOR POWER OUTAGES

(71) Applicant: Samsung Electronics Co., Ltd., Suwon-si (KR)

(72) Inventors: Wentao Wu, Milpitas, CA (US); Sompong Olarig, Pleasanton, CA (US); William Schwaderer, Sparks, NV (US); Ramdas Kachare, Pleasanton, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/143,153

(22) Filed: Jan. 6, 2021

(65) Prior Publication Data

US 2021/0124681 A1    Apr. 29, 2021

Related U.S. Application Data

(63) Continuation of application No. 15/950,114, filed on Apr. 10, 2018, now Pat. No. 10,901,898.
(Continued)

(51) Int. Cl.
*G06F 12/08* (2016.01)
*G06F 3/06* (2006.01)
*G06F 12/0804* (2016.01)

(52) U.S. Cl.
CPC ........ *G06F 12/0804* (2013.01); *G06F 3/0604* (2013.01); *G06F 3/0634* (2013.01);
(Continued)

(58) Field of Classification Search
CPC .... G06F 3/0688; G06F 3/0634; G06F 3/0604; G06F 3/0647; G06F 2212/1032;
(Continued)

(56) References Cited

U.S. PATENT DOCUMENTS 7,878,861 B2    2/2011   Pappas et al.
8,230,257 B2 ‡  7/2012   Wilson ................... G11C 5/141
                                              714/14
(Continued)

FOREIGN PATENT DOCUMENTS

CN    103500131 A    1/2014
CN    104122977 A    10/2014
(Continued)

OTHER PUBLICATIONS

Final Office Action for U.S. Appl. No. 15/950,114, mailed Nov. 13, 2019.
(Continued)

*Primary Examiner* — Hua J Song
(74) *Attorney, Agent, or Firm* — Renaissance IP Law Group LLP (57) ABSTRACT

A storage system includes at least one solid-state drive (SSD) and a baseboard management controller (BMC). The at least one SSD communicates over a communication link information that the at least one SSD includes a predetermined number of super capacitors in which the predetermined number includes 0, and is capable of providing a mode of operation to flush data in a non-volatile memory to a non-volatile memory that spans a predetermined amount of time if a loss of power condition is detected. The BMC device receives the information from the SSD and in response sends a message to the at least on SSD to enter the mode of operation.

19 Claims, 5 Drawing Sheets

Related U.S. Application Data (60) Provisional application No. 62/630,809, filed on Feb. 14, 2018.

(52) U.S. Cl.
CPC .......... *G06F 3/0647* (2013.01); *G06F 3/0688* (2013.01); *G06F 2212/1032* (2013.01); *G06F 2212/202* (2013.01)

(58) Field of Classification Search
CPC ........... G06F 12/0804; G06F 2212/202; G06F 2212/261; G06F 2212/313; G06F 12/0868; G06F 2212/214; G06F 1/30; G06F 3/0658; G06F 3/0623; G06F 3/0626; G06F 3/0653
USPC ......................................................... 711/103
See application file for complete search history.

(56) References Cited

U.S. PATENT DOCUMENTS

| | | | |
|---|---|---|---|
| 8,479,032 B2 | 7/2013 | Trantham et al. | |
| 8,934,255 B2 ‡ | 1/2015 | Bang ..................... | H01G 11/78 361/72 |
| 9,252,603 B2 | 2/2016 | Shim | |
| 9,465,426 B2 | 10/2016 | Li | |
| 9,568,971 B2 | 2/2017 | Meir et al. | |
| 9,626,259 B2 ‡ | 4/2017 | Yong .................. | G06F 11/2015 |
| 9,721,660 B2 ‡ | 8/2017 | Kelly .................. | G06F 13/4282 |
| 10,817,188 B2 * | 10/2020 | Ho ........................ | G06F 3/0656 |
| 11,100,024 B2 | 8/2021 | Olarig et al. | |
| 2012/0144094 A1 * | 6/2012 | Harasawa ........... | G06F 13/1673 711/E12.008 |
| 2013/0093506 A1 | 4/2013 | Yang et al. | |
| 2016/0378344 A1 ‡ | 12/2016 | Nachimuthu ........... | G06F 3/065 711/103 |
| 2017/0020019 A1 | 1/2017 | Tuma | |
| 2017/0352422 A1 ‡ | 12/2017 | Pardoe .................. | G11C 16/14 |
| 2018/0032390 A1 ‡ | 2/2018 | Rahmanian ......... | G06F 11/0754 |
| 2019/0050330 A1 * | 2/2019 | Vui ....................... | G06F 3/0679 |
| 2019/0079125 A1 * | 3/2019 | Abrahams .............. | G11C 29/50 |
| 2019/0180793 A1 * | 6/2019 | Berman ................ | G11C 11/005 |

FOREIGN PATENT DOCUMENTS

| | | |
|---|---|---|
| CN | 107210057 A | 9/2017 |
| KR | 20180012190 A | 2/2018 |

OTHER PUBLICATIONS

Notice of Allowance for U.S. Appl. No. 15/950,114, mailed Sep. 16, 2020.

Office Action for U.S. Appl. No. 15/950,114, mailed Apr. 12, 2019.

Wong, William, "Micron's NVDIMM Delivers Persistent Memory", ElectronicDesign, Nov. 22, 2017, retrieved from http://www.electronicdesign.com/industrial-automation/micron-s-nvdimm-delivers-persistent-memory on Jan. 4, 2021.

\* cited by examiner
‡ imported from a related application

COST-EFFECTIVE SOLID STATE DISK DATA-PROTECTION METHOD FOR POWER OUTAGES

CROSS-REFERENCE TO RELATED APPLICATION

This patent application is a continuation of U.S. patent application Ser. No. 15/950,114, filed Apr. 10, 2018, which claims the priority benefit under 35 U.S.C. § 119(e) of U.S. Provisional Patent Application No. 62/630,809, filed on Feb. 14, 2018, the disclosures of which are incorporated herein by reference in their entirety.

TECHNICAL FIELD

The subject matter disclosed herein generally relates to storage systems and, more particularly, storage systems that store critical information if an imminent power-loss event is detected.

BACKGROUND

A primary task of a data-center is to prevent or otherwise minimize the possibility of permanent data loss. Such measures may take many forms. For example, one measure that may be used for a solid-state drive (SSD) is to include super capacitors (supercaps) internal to the SSD that store electrical energy that may be used to ensure that critical information residing in a volatile DRAM in the SSD is saved (i.e., flushed) to persistent memory if a loss of power is detected. The energy stored by the supercaps is used to provide short-term power for the retention of in-flight, or pending, write data.

SSD form-factor constraints necessitate that SSD supercaps are physically small. Accordingly, because relatively physically small supercaps store relatively less electrical power, for most SSDs a relatively large number of relatively small supercaps are used. For example, an SSD that includes supercaps may include more than 30 internal supercaps. Thus, for a total of 24 SSDs in a fully loaded 2U chassis, more than 700 supercaps may be used. Supercaps, however, are relatively expensive, prone to failure, degrade over time and, most importantly, occupy precious SSD board space. Consequently, in order to provide a reasonable warranty period, SSD manufacturers normally overprovision the number of the supercaps to compensate for the degradation over time.

SUMMARY

An example embodiment provides a storage system that may include at least one SSD and a baseboard management controller device. The at least one SSD may communicate over a communication link information that the at least one SSD is capable of providing a mode of operation to flush data in a non-volatile memory to a non-volatile memory that spans a predetermined amount of time if a loss of power condition is detected. The baseboard management controller device that receives the information from the SSD and in response sends a message to the at least on SSD to enter the mode of operation. In one embodiment, the baseboard management controller device in response to the information further controls a voltage to be applied to a connector pin of the at least one SSD.

Another example embodiment provides an SSD that may include non-volatile memory, volatile memory and an SSD controller device. The volatile memory may store host data-write request data that the SSD has acknowledged, and/or SSD controller state information. The SSD controller device may communicates over a communication link information that the SSD includes a predetermined number of super capacitors in which the predetermined number includes 0, and may be capable of providing a mode of operation to flush data in a non-volatile memory to a non-volatile memory that spans a predetermined amount of time if a loss of power condition is detected. The SSD controller device may further receive a message to enter the mode of operation.

Still another example embodiment provides a storage system that may include at least one SSD, a mid-plane, and a baseboard management controller device. The at least one SSD may communicates over a communication link information that the at least one SSD is capable of providing a mode of operation to flush data in a non-volatile memory to a non-volatile memory if a loss of power condition is detected that spans a predetermined amount of time, and the SSD may include a U.2 connector. The mid-plane may include a connector that receives the U.2 connector of the at least one SSD and at least one supercap that may be coupled to the connector that receives the U.2 connector of the at least one SSD. The baseboard management controller device may receive the information from the SSD and in response may send a message to the at least on SSD to enter the mode of operation, and the baseboard management controller in response to the information may further control a voltage to be applied to a connector pin of the U.2 connector of the at least one SSD.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth.

One embodiment of an SSD disclosed herein includes no internal supercaps, but is able to provide that critical information residing in a volatile DRAM is flushed to persistent memory if a loss of power is detected. Elimination of supercaps that are internal to an SSD not only reduces costs, but permits the vacated space to be repurposed and used for additional storage media, thereby increasing the data-storage capacity of an SSD. In another embodiment, an SSD may include fewer internal supercaps than a typical SSD device and still provide that critical information residing in a volatile DRAM is flushed to persistent memory if a loss of power is detected because additional supercaps that provide energy for a flushing operation may be located external to the SSD, such as on a mid-plane, a motherboard, and/or power distribution board (PDB), of a storage system.

Figure 1:
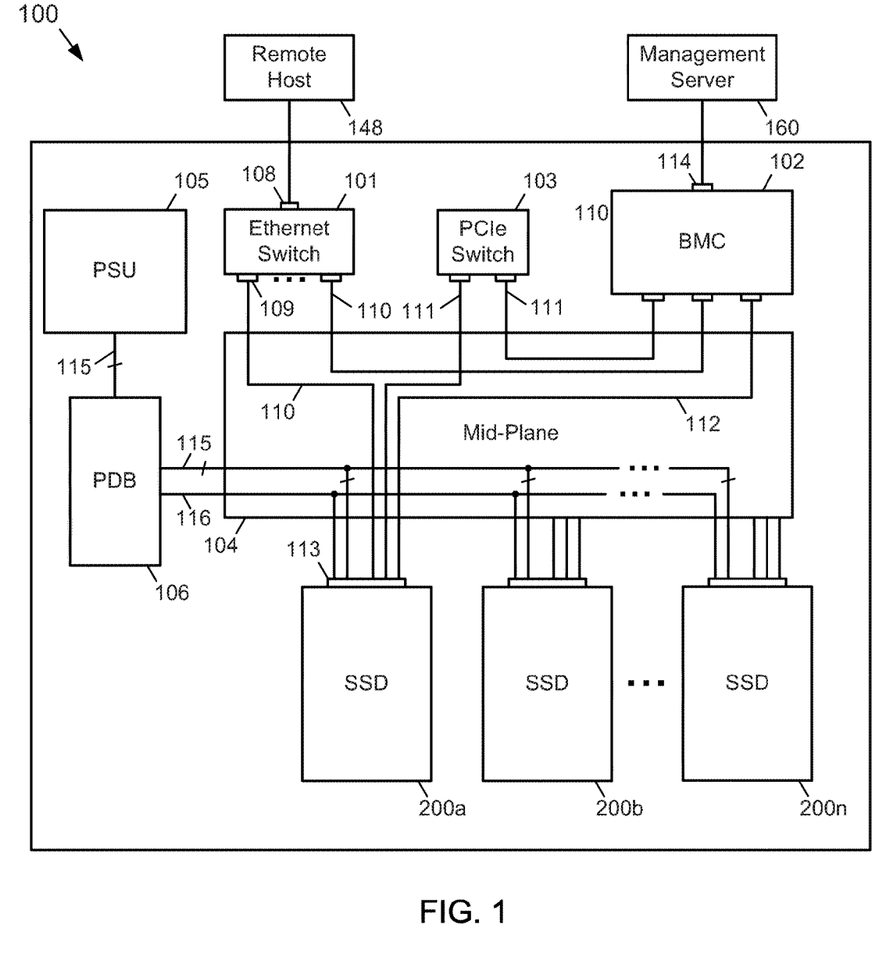
FIG. 1 depicts an example embodiment of a storage system according to the subject matter disclosed herein.

FIG. 1 depicts an example embodiment of a storage system 100 according to the subject matter disclosed herein. The storage system 100 may include an Ethernet switch 101, a baseboard management controller (BMC) device 102, a Peripheral Component Interconnect Express (PCIe) switch 103, a mid-plane 104, a power supply unit (PSU) 105, a power distribution board (PDB) 106, and one or more SSDs 200a 200n. In one embodiment, the one or more SSDs may be Non-Volatile Memory Express (NVMe) devices. In an embodiment in which the SSDs 200 are NVMe devices, the Ethernet switch board may be replaced by an X86 motherboard. An Ethernet switch board would be used for SSDs 200 configured as NVMe over Fabrics (NVMe oF) devices, whereas an X86 motherboard would be used for NVMe devices. Although only one Ethernet switch 101 and only one PCIe switch 103 are depicted as being part of the storage system 100, it should be understood that multiple Ethernet switches 101 and multiple PCIe switches 103 may be part of the storage system 100. Additionally, the different components forming the storage system 100 may be embodied as separate components or as separate modules. Alternatively, two or more of the components or modules that are part of the storage system 100 may be integral with each other.

The storage system 100 may be physically embodied as a chassis, or as a rack, in which one or more of the SSDs 200 may be locally arranged with respect to the storage system 100. One or more additional SSDs 200 may also be remotely located with respect to the storage system 100. In one embodiment, the storage system 100 may include 24 SSDs 200. In another embodiment, the storage system 100 may include 48 SSDs 200. In still another embodiment, the storage system 100 may include any number of the SSDs 200.

The Ethernet switch 101 may include a plurality of uplink Ethernet ports 108, of which only one up-link port 108 is depicted in FIG. 1. The one or more uplink ports 108 may connect the Ethernet switch 101 to one or more remote hosts 148, of which only one host 148 is depicted. The Ethernet switch 101 also may include a plurality of downlink Ethernet ports 109, of which only two ports 109 are depicted in FIG. 1. A management port (not specifically indicated) may connect the Ethernet switch 101 through the mid-plane 104 to the BMC device 102 and/or to the individual SSDs 200. In one embodiment, the BMC device 102 and each SSD 200 may include corresponding Ethernet ports although not specifically identified.

In one embodiment, the BMC device 102 may be located in a main switch board that is part of the storage system 100. The BMC device 102 may be configured to provide management functions, such as, but not limited to, discovery, configuration, and operational status and health monitoring of each respective SSDs 200. In one embodiment, the BMC device 102 may also be configured to control and/or configure internal functionality of the SSDs 200 and control power supply voltages supplied to the SSDs 200 so that critical information residing in a volatile DRAM may be flushed to persistent memory if a loss of power is detected. Such critical data that may be flushed may include any host data-write request data that the SSD has acknowledged, and/or SSD controller state information that, if available in persistent memory after a device restart, dramatically accelerates device state instantiation and resumption of storage functionality.

It should be noted that an SSD 200 may not need to preserve host write requests that the SSD has received, but has not acknowledged. In such a situation of unacknowledged host write requests, the host may be responsible to recover any unacknowledged write-request activity. Thus, the SSDs 200 will implicitly have a limited amount of data that may need to be flushed to persistent memory, which ensures that an individual SSD does not have more data to flush than available supercap holdup energy may operationally support.

In one embodiment of the storage system 100, there may be one or more communication paths between the BMC device 102 and the SSDs 200 that may be used for communicating control information and for obtaining information relating to the management functions provided by the BMC device 102. A first communication path may be over a management port of the Ethernet switch 101. A second communication path may be over a PCIe bus 111 through the PCIe switch 103 and the mid-plane 104. A third path may be through a System Management Bus (SMBus) 112 that is connected between the BMC device 102 and the SSDs 200.

The BMC device 102 may also have a management port 114 through which a management server 160 that is operated by an administrator (a user) may communicate with and control the BMC device 102. The management server 160 may be located in proximity to or remotely from the storage system 100.

The mid-plane 104 may include signal lines that are used for communication links and control links, and power supply lines that supply power to the various components of the storage system 100. In one embodiment, the mid-plane 104 includes receptacle connectors mating with connectors of the SSDs 200.

In one embodiment, the PSU 105 may be located within the storage system 100. In another embodiment, the PSU 105 may be located separately from the storage system 100. The PSU 105 may provide one or more power supply voltages to the storage system 100. In one embodiment, the PSU 105 may supply multiple power supply voltages 115, such as, but not limited to +12 V, +5 V and +3.3 V, to the storage system 100. The power supply voltages output from the PSU 105 may be distributed through the PDB 106 to the various components forming the storage system 100. In another embodiment, the PSU 105 may also include the capability to provide a backup energy source for the storage system 100.

The PDB 106 may include power distribution lines to distribute the power supply voltages 115 throughout the storage system 100, including to the mid-plane 104. In one embodiment, the PDB 106 may include components that allow the BMC device 102 to control the application of a selected power supply voltage 116 to at least selected SSDs 200.

Figure 2A:
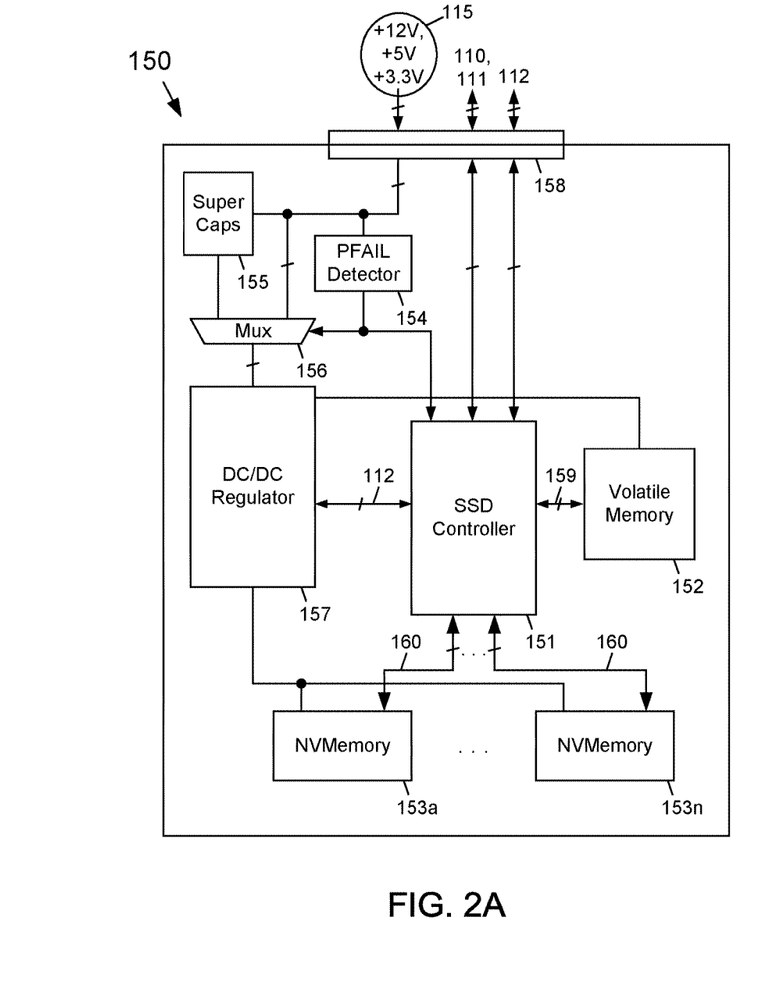
FIGS. 2A and 2B respectively depict an example embodiment of a typical SSD that includes internal supercaps and an example embodiment of an SSD according to the subject matter disclosed herein.
Figure 2B:
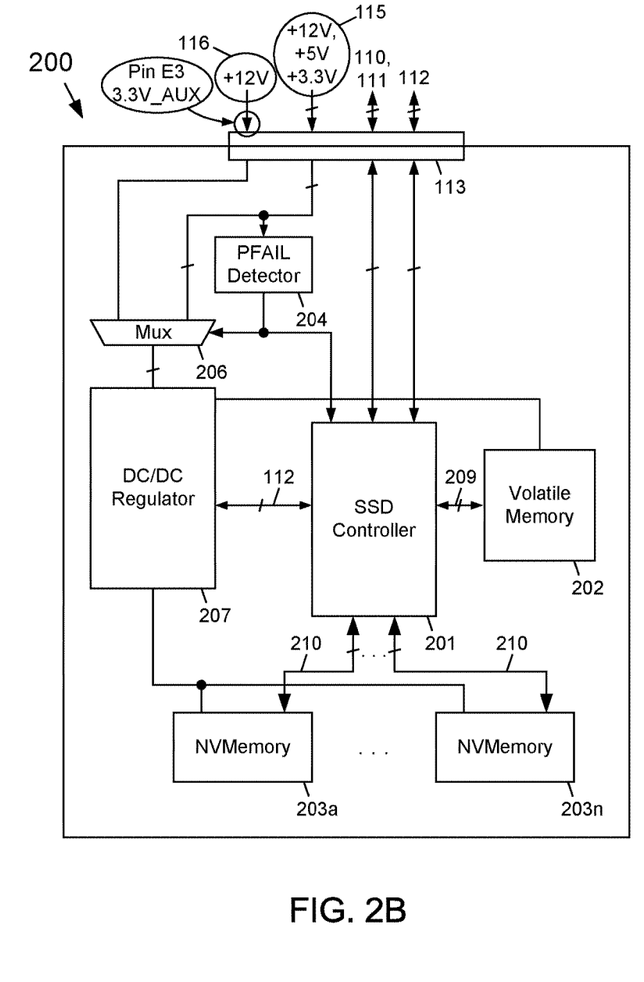

FIGS. 2A and 2B respectively depict an example embodiment of a typical SSD 150 that includes internal supercaps and an example embodiment of an SSD 200 according to the subject matter disclosed herein. As depicted in FIG. 2A, the typical SSD 150 includes an SSD controller 151, volatile memory 152, non-volatile memory 153, a power-fail (PFAIL) detector 154, supercaps 155, a power multiplexer 156, and a DC/DC regulator 157. In one embodiment, the volatile memory 152 may be dynamic random access memory (DRAM), and the non-volatile memory 153 may be formed from a plurality of non-volatile memory dies or arrays 153a-153n.

The typical SSD 150 also includes a connector 158, which may be a U.2 or a M.2 connector. Control signals and data signals may pass bi-directionally through the connector 158. For example, the control signals and data signals may be bi-directionally communicated through the connector 158 to the typical SSD 150 over an Ethernet network 110 using the SAS pins, a PCIe bus 111, and/or an SMBus 112. Control information may be communicated internally throughout the typical SSD 150 over, for example, an internal SMBus 112 and/or an inter-integrated circuit ($I^2C$) bus (not indicated). Data may be communicated internally throughout the typical SSD 150 over a data bus 159 to the volatile memory 152 and over a data bus 160 to the non-volatile memory 153.

Power supply voltages 115, such as +12 V, +5 V and +3.3 V, may also be supplied to the connector 158 to power the typical SSD 150. The power supply voltages may be coupled to one input of the power multiplexer 156 and to the supercaps to store a charge on the supercaps. The DC/DC regulator 157 receives power from the power multiplexer 156 and supplies regulated voltages as required throughout the typical SSD 150.

The PFAIL detector 154 is capable of detecting imminent external power-supply power-loss events so that critical information residing in the volatile memory 152 may be flushed to persistent memory 153 if a loss of power is detected. A powerfail_detected signal (not shown) associated with the power supply voltages 115 may also signal that an external power-supply power-loss may be imminent. In normal operation with no imminent power-loss event being sensed, power for the SSD 150 is supplied through the power multiplexer 156 to the DC/DC regulator 157, which in turn, supplies regulated power to the typical SSD 150. If, for example, an imminent power loss condition is detected, the detected condition is communicated to the power multiplexer 156 and to the SSD controller 151. In response, the power multiplexer 156 switches the source of power from external (i.e., supplied through connector 158) to the internal supercaps 155, and the SSD controller 151 flushes critical information (i.e., host data-write request that the SSD has acknowledged, and/or SSD controller state information) residing in the volatile memory 152 to persistent memory 153.

FIG. 2B depicts an example embodiment of an SSD 200 in contrast to the typical SSD 150 of FIG. 2A. The SSD 200 may include many of the same components as the typical SSD 150, except that the example embodiment of the SSD 200 depicted in FIG. 2B does not include supercaps. More specifically, the SSD 200 includes an SSD controller 201, volatile memory 202, non-volatile memory 203, a PFAIL detector 204, a power multiplexer 206, a DC/DC regulator 207, and a connector 113. In one embodiment, the volatile memory 202 may be DRAM, and the non-volatile memory 203 may be formed from a plurality of non-volatile memory arrays 203a-203n.

The connector 113 may be a U.2 or a M.2 connector. Control signals and data signals may pass bi-directionally through the connector 113. For example, the control signals and data signals may be bi-directionally communicated through the connector 113 to the SSD 200 over an Ethernet network 110, a PCIe bus 111, and/or an SMBus 112. Control information may be communicated internally throughout the SSD 200 over, for example, an internal SMBus 112 and/or an $I^2C$ bus (not indicated). Data may be communicated internally throughout the SSD 200 over a data bus 209 to the volatile memory 202 and over a data bus 210 to the non-volatile memory 203.

Similar to the typical SSD 150, power supply voltages 115, such as +12 V, +5 V and +3.3 V, may also be supplied to the connector 113 to power the SSD 200. The power supply voltages may be coupled to one input of the power multiplexer 206. The DC/DC regulator 207 receives power from the power multiplexer 206 and supplies regulated voltages as required throughout the SSD 200. Another difference from the typical SSD 150 is that the SSD 200 may also be configured to receive power supply voltage 116, such as +12 V, through a 3.3VAUX pin E3 of the U.2 connector 113. The +12 V supplied through the 3.3VAUX pin E3 of the U.2 connector 113 may be supplied to the second input of the power multiplexer 206.

In one embodiment, the BMC device 102 may control +12 V being supplied to both the 3.3V_AUX pin E3 based on whether an SSD 200 may use +12 V being supplied to the 3.3V_AUX pin E3 to save critical information in volatile DRAM to persistent memory when loss-of-power is detected. Additional details regarding this functionality are described in connection with FIGS. 3 and 4.

Yet another difference from the typical SSD 150 is that the SSD 200 may be queried by the BMC device 102 to determine whether the SSD 200 includes internal supercaps. If the SSD 200 does not include internal supercaps and the SSD 200 is capable of utilizing +12 V on the 3.3V_AUX pin E3, the SSD 200 may be configured by the BMC device 102 to enable a write-cache functionality so that the SSD 200 may flush critical information residing in the volatile memory 202 to persistent memory 203 if a loss of power is detected by the PFAIL detector 204. A powerfail_detected signal (not shown) associated with the power supply voltages 115 may also signal that an external power-supply power-loss may be imminent.

In normal operation with no imminent power-loss event being sensed, power for the SSD 200 may be supplied through the power multiplexer 206 to the DC/DC regulator 207, which in turn, supplies regulated power to the SSD 200. If, for example, an imminent power loss condition is detected, the detected condition is communicated to the power multiplexer 206 and to the SSD controller 201. In response, the power multiplexer 206 switches the source of power from external (i.e., supplied through connector 113) to the 3.3V_AUX pin E3 of the connector 113, and the SSD controller 201 flushes critical information (i.e., host data-write request that the SSD has acknowledged, and/or SSD controller state information) residing in the volatile memory 202 to persistent memory 203 if a loss of power is detected.

The BMC device 102 may communicate with each SSD 200 of the storage system 100 configure internal operation of the SSD 200 based on the internal configuration of the SSD 200. For example, the BMC device 102 may query an SSD 200 during a normal power-on initialization process to determine whether the SSD 200 includes internal supercaps and, if so, the capability of the supercaps. If an SSD 200 indicates that it includes internal supercaps, the BMC device 102 may monitor the status of the internal supercaps to set allowable outstanding power requirements as the supercaps degrade over time, which may result in the BMC device 102 dynamically changing the allowable number of outstanding acknowledged host writes that may be required to be flushed in power out events for each individual SSD 200.

Another example embodiment of an SSD 200 may include fewer internal supercaps than a typical SSD 150 and still provide that critical information residing in a volatile DRAM 202 is flushed to non-volatile memory 203 if a loss of power is detected because additional supercaps that provide energy for a flushing operation may be located external to the SSD 200, such as on a mid-plane 104, a motherboard, and/or power distribution board (PDB) 106, of a storage system 100. For such an example embodiment, +3.3 V may be supplied to the 3.3V_AUX pin E3 of the connector 113, in which case +12 V would not be supplied to the 3.3V_AUX pin E3 of the connector 113.

Figure 3A:
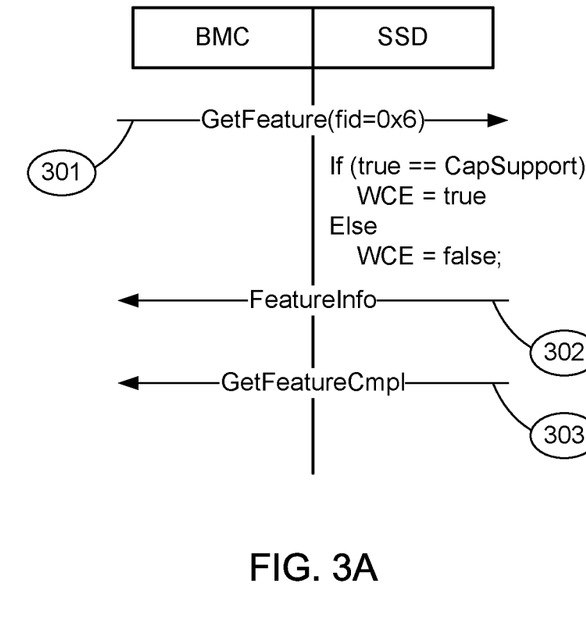
FIG. 3A depicts an example signal flow diagram between a BMC device and an SSD that may be used during a normal power-on initialization process to determine whether the SSD provides supercap support according to the subject matter disclosed herein.

FIG. 3A depicts an example signal flow diagram between a BMC 102 device and an SSD that may be used during a normal power-on initialization process to determine whether the SSD provides supercap support according to the subject matter disclosed herein. At 301 in FIG. 3A, the BMC device 102 sends a GetFeature message to an SSD to determine whether the SSD provides supercap support. If the SSD provides supercap support, the Write Cache Enable (WCE) is true, otherwise WCE is false. At 302, the SSD replies to the BMC device 102 with a FeatureInfo message indicating whether WCE is true or false. At 303, the SSD sends a GetFeatureCmpl message to the BMC device 102 to complete the messaging transaction.

If an SSD 200 communicates to the BMC device 102 that the SSD includes no internal, emergency-operation supercap capacity, but can support an external back-up power supply voltage of 12 V via the 3.3V_AUX pin E3, the BMC may supply +12 V to the 3.3V_AUX pin E3 and communicate to the SSD that the 3.3V_AUX pin E3 is supplied with +12 V. Thus, the SSD may utilize power supply voltages 115 for normal operation, and utilize the power supply voltage 116 (i.e., +12 V) supplied to the 3.3V_AUX pin E3 to flush critical data from volatile memory to non-volatile memory. The BMC device 102 may configure the internal functionality of the SSD to enable a write-cache functionality in order to flush critical information to persistent memory if a loss of power is detected.

Figure 3B:
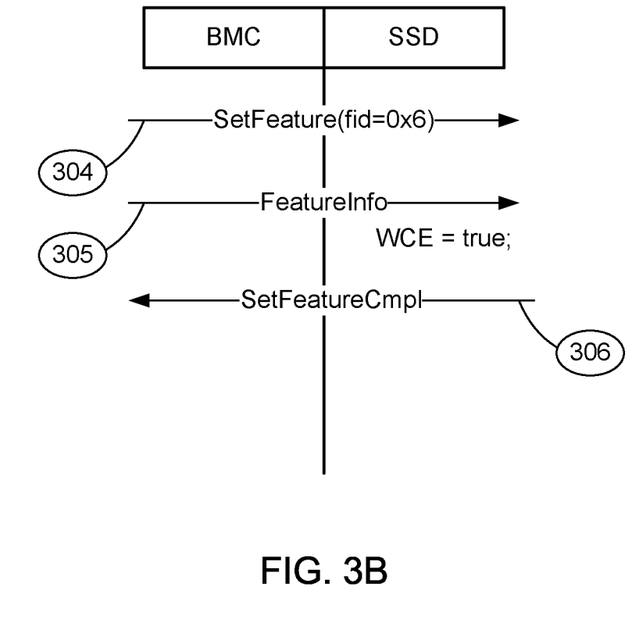
FIG. 3B depicts an example signal flow diagram between a BMC device and an SSD that does not include internal supercaps (and does not provide supercap support) that sets a power state and enables a write-cache functionality of the SSD according to the subject matter disclosed herein.

FIG. 3B depicts an example signal flow diagram between a BMC device 102 and an SSD that does not include internal supercaps (and does not provide supercap support) that sets a power state and enables a write-cache functionality of the SSD according to the subject matter disclosed herein. At 304, the BMC device 102 sends a SetFeature message to the SSD. At 305, the BMC device 102 sends a FeatureInfo message to set WCE to be true. At 306, the SSD sends a SetFeatureCmpl message to the BMC device 102 to complete the transaction. By enabling the WCE, an SSD 200 that does not contain internal supercaps may flush critical information (i.e., host data-write request that the SSD has acknowledged, and/or SSD controller state information) residing in the volatile memory 202 to persistent memory 203 if a loss of power is detected because power will be supplied by the storage system 100 through the PDB 106 to flush the data.

Table 1 below sets forth example power states that may be communicated and set in an SSD according to the subject matter disclosed herein.

TABLE 1

Example Power States

| Power State | MP | AP | ENTLAT | EXTLAT | RRT | RRL | RWL |
|---|---|---|---|---|---|---|---|
| 0 | 35 W | 33 W | 5 µs | 5 µs | 0 | 0 | 0 |
| 1 | 25 W | 21 W | 5 µs | 7 µs | 0 | 0 | 1 |
| 2 | 25 W | 21 W | 5 µs | 8 µs | 1 | 0 | 0 |
| 3 | 20 W | 19 W | 20 µs | 15 µs | 2 | 0 | 2 |
| 4 | 20 W | 17 W | 20µ | 30 µs | 1 | 1 | 3 |
| 5 | 15 W | 15 W | 50µ | 50 µs | 2 | 2 | 4 |
| 6 | 15 W | 13 W | 50µ | 5000 µs | 4 | 3 | 5 |
| . | . | . | . | . | . | . | . |
| . | . | . | . | . | . | . | . |
| . | . | . | . | . | . | . | . |
| 31 | 5 W | 5 W | 100 µs | 5000 µs | 5 | 4 | 6 |

In Table 1, "MP" stands for Maximum Power, "ENTLAT" stands for Entry Latency, "EXTLAT" stands for Exit Latency, "RRT" stands for Relative Read Throughput, "RRL" stands for Relative Read Latency, "RWT" stands for Relative Write Throughput, and "RWL" stands for Relative Write Latency.

Thus, the subject matter disclosed herein is compatible with typical SSDs that only expect +3.3 V on the 3.3V_AUX line because the BMC will recognize such drives, and will not supply emergency +12 V power to the typical SSDs. Additionally, in power-fail events, a powerfail_detected signal associated with the power supply voltages 115 may be available. The powerfail_detected signal alerts the SSDs 200 supported with +12 V on the 3.3V_AUX pin E3 that a power loss is imminent and that emergency flush operations that may be performed using residual power available from the power supply voltages 115 and the +12 V supplied to the 3.3V_AUX pin E3.

Figure 4:
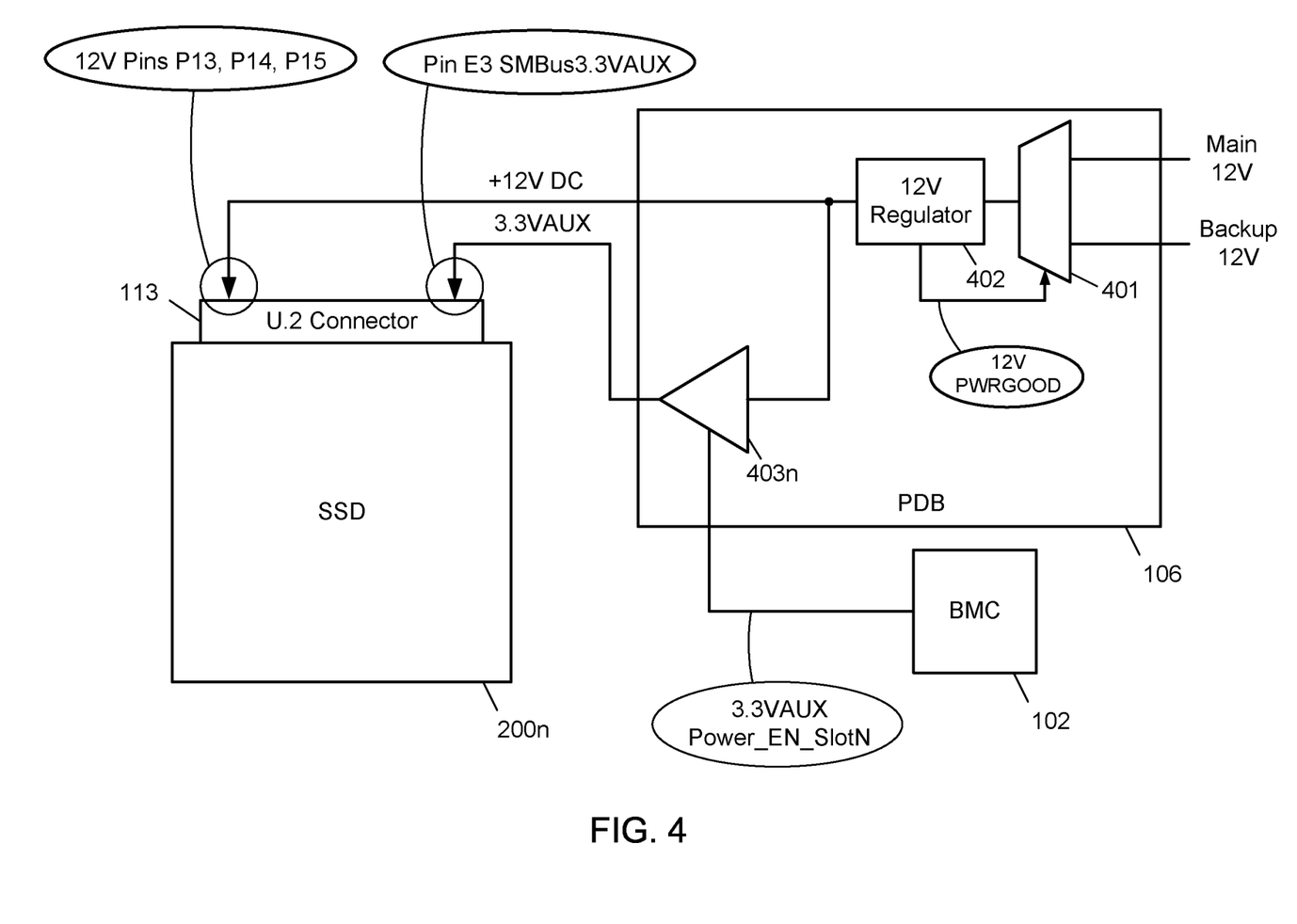
FIG. 4 depicts an example embodiment of power supply voltages that are applied to an SSD through a PDB according to the subject matter disclosed herein.

FIG. 4 depicts an example embodiment of power supply voltages that are applied to an SSD 200 through a PDB 106 according to the subject matter disclosed herein. In one embodiment, the PDB 106 includes a two-input power multiplexer 401, a 12 V regulator 402 and one or more power switches 403, of which only power switch 403n is depicted. The PSU 105 (FIG. 1) may supply +12 V to a first input of the power multiplexer 401. A backup power source may supply a backup +12 V to a second input of the first multiplexer 401. The 12 V regulator 402 includes a 12V PWRGOOD signal output that indicates that the 12 V being supplied from the regulator 402 is good. The 12V PWRGOOD signal is supplied to a control input of each of the power multiplexer 401. If the 12V PWRGOOD signal is true, then both the power multiplexer 401 conducts power sourced from the PSU 105. If the 12V PWRGOOD signal is false, then the power multiplexer 401 conducts power sourced from a backup power supply.

The BMC device 102 may provide a control signal 3.3VAUX Power_EN_SlotN to the power switch 403n that may enable the power switch 403n to supply +12 V to an SSD 200. If the BMC device 102 determines that a particular SSD 200n does not include internal supercaps and is capable of utilizing +12 V supplied to the 3.3V_AUX pin E3, the BMC device 102 may enable the power switch 403n to supply +12 V so that there will sufficient energy available to flush critical information residing in the volatile memory 202 to persistent memory 203 of the particular SSD 200n if a loss of power is detected.

Power may be supplied from the PDB 106 to an SSD 200n through the connector 113 of the SSD 200n. In one embodiment, the connector 113 may be a U.2 connector through which +12 V is supplied to pins P13, P14 and P15, and through which +12 V may be supplied to the 3.3V_AUX pin E3. According to the subject matter disclosed herein, the 3.3V_AUX pin E3 of a U.2 connector may be used as to supply a secondary, auxiliary power source as a substitute for a supercap reservoir power resource that would be internal to a typical SSD.

Figure 5A:
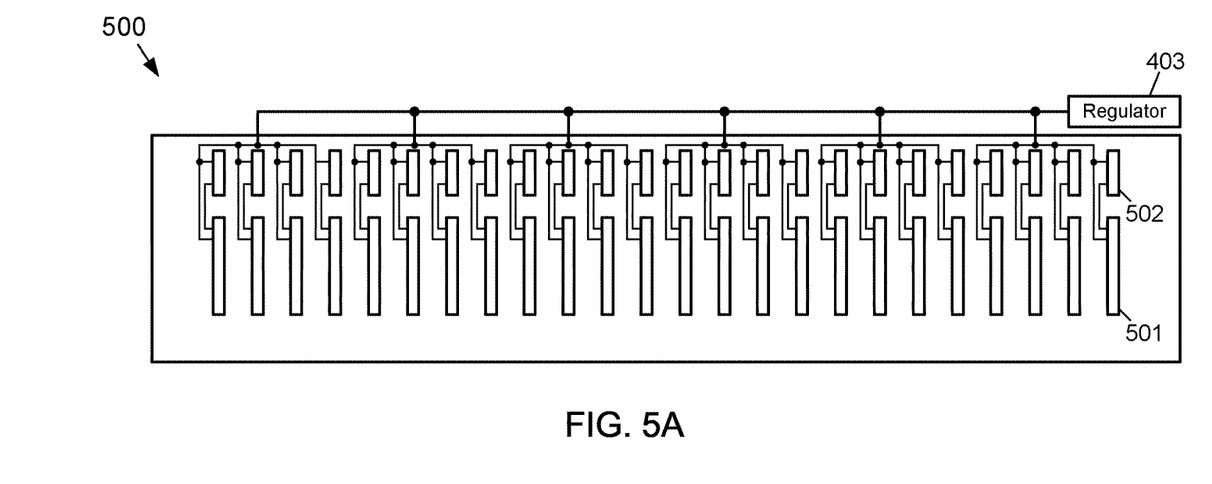
FIG. 5A depicts an example embodiment of a mid-plane according to the subject matter disclosed herein.

FIG. 5A depicts an example embodiment of a mid-plane 500 according to the subject matter disclosed herein. The mid-plane 500 includes a plurality of connectors 501 and a plurality of supercaps 502. Each connector 501 mates with a connector 113 of an SSD 200. Each supercap 502 corresponds to a connector 501. The PDB 106 (FIGS. 1 and 4) supplies one or more regulated voltages 115 and the voltage 116 to the mid-plane 500. Each supercap 502 may be coupled to the voltage 116 supplied to the mid-plane 500.

The number of in-flight or pending write-data requests may vary by SSD in a chassis, so a centralized supercap pool or group of supercaps may enable SSDs having relatively more in-flight or pending write-data requests to opportunistically consume stored energy than SSDs having relatively fewer in-flight or pending write data requests. The supercaps that may be located in a centralized location may collectively provide emergency power to all SSDs within a chassis. Alternately, mutually exclusive and collectively exhaustive supercap reservoir subgroups may be arranged in a chassis to support corresponding mutually exclusive and collectively exhaustive SSD subgroups within the chassis. As still another alternative, each SSD in a chassis may have a multiplicity of dedicated supercaps that provides emergency power to the SSD. Additionally, the centralized supercaps may be connected in parallel so that a single or multiple supercap failures would not affect the operation because the surviving supercaps and standby power may continue to provide sufficient power during a power outage.

Figure 5B:
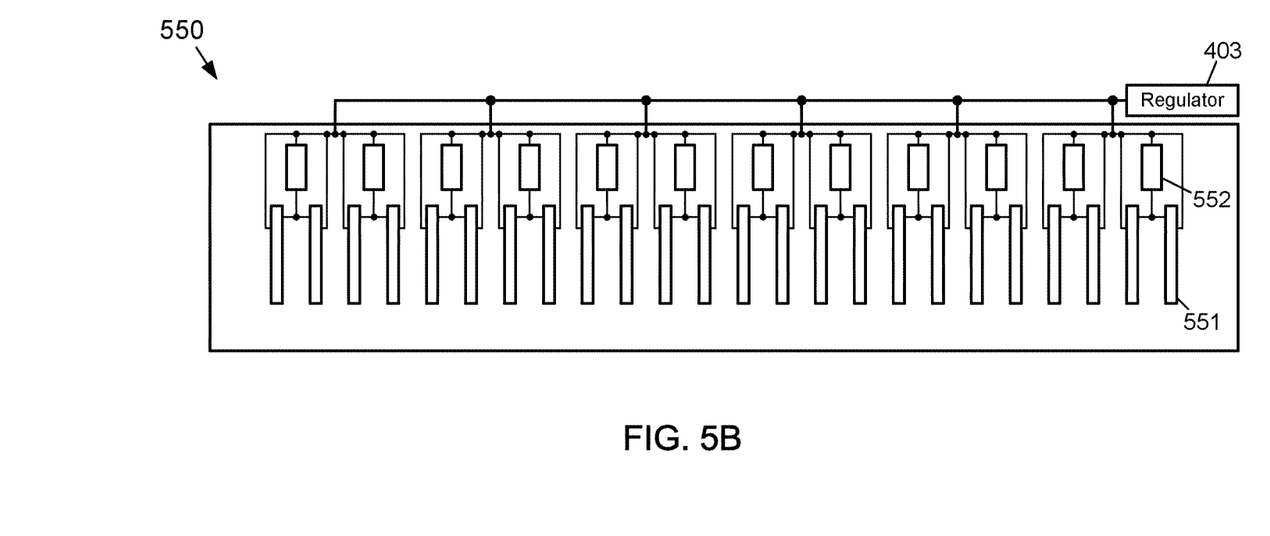
FIG. 5B depicts another example embodiment of a mid-plane having centralized supercaps according to the subject matter disclosed herein.

FIG. 5B depicts another example embodiment of a mid-plane 550 having centralized supercaps according to the subject matter disclosed herein. The mid-plane 550 includes a plurality of connectors 551 and a plurality of supercaps 552. Each connector 551 mates with a connector 113 of an SSD 200. Each supercap 552 is relatively larger both physically and capacitively than the example supercaps 502 (FIG. 5A) so that one supercap 552 corresponds to two connectors 551. That is the supercaps 552 provide a centralized supercap for, in this case, two SSDs 200 (not shown in FIG. 5B). The PDB 106 (FIGS. 1 and 4) supplies one or more regulated voltages 115 and the voltage 116 to the mid-plane 550. Each supercap 552 may be coupled to the voltage 116 supplied to the mid-plane 550. Although FIG. 5B depicts a centralized supercap for two SSDs 200, it should be understood that centralized supercaps may be associated with more than two SSDs 200.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A storage system, comprising:
 a storage device comprising a volatile memory, and a non-volatile memory, where the storage device communicates over a communication link information that the storage device is capable of providing a mode of operation to flush data in the volatile memory to the non-volatile memory based on a power condition; and
 a power management device that receives information from the storage device, using a communication path from the storage device, the information indicating that the storage device is capable of providing the mode of operation to flush data and based on the received information, sends a message to the storage device to enter the mode of operation, wherein the storage device receives power, to flush the data, from two or more capacitors that are external to the storage device.

2. The storage system of claim 1, wherein the power management device, based on the information, further controls a voltage applied to a connector pin of the storage device.

3. The storage system of claim 2, wherein the connector pin comprises an auxiliary connection pin.

4. The storage system of claim 2, wherein the voltage comprises +12 V.

5. The storage system of claim 1, wherein the storage device comprises a predetermined number of super capacitors.

6. The storage system of claim 1, wherein the storage device comprises a solid-state drive (SSD).

7. The storage system of claim 1, further comprising a mid-plane to which the storage device connects,
 wherein the mid-plane comprises at least one super capacitor associated with the storage device.

8. A storage device, comprising:
 non-volatile memory;
 volatile memory that stores at least one of host write request data or storage device controller state information; and
 a storage device controller;
 wherein the storage device communicates, using a communication path from the storage device, information that the storage device is capable of providing a mode of operation to flush data in the volatile memory to the non-volatile memory based on a power condition, and
 wherein the storage device controller receives a message to enter the mode of operation to flush data, and the storage device receives power, to flush the data, from two or more capacitors that are external to the storage device.

9. The storage device of claim 8, wherein the message is received from a power management device of a storage system.

10. The storage device of claim 9, wherein the storage device comprises a U.2 connector, and
 wherein a connector pin of the U.2 connector receives a power supply voltage that is used by the storage device to flush data from the volatile memory to the non-volatile memory based on the power condition.

11. The storage device of claim 10, wherein the connector pin comprises an auxiliary connection pin.

12. The storage device of claim 8, wherein the storage device comprises a solid-state drive (SSD).

13. The storage device of claim 8, wherein the communication link comprises one of an Ethernet network, a Peripheral Component Interconnect Express (PCIe) bus, or a System Management Bus (SMBus).

14. The storage device of claim 8, wherein the power condition comprises a first portion, and the storage device further communicates over the communication link, information that the storage device is capable of providing a mode of operation to flush data in volatile memory to a non-volatile memory based on a second portion of the power condition.

15. A storage system, comprising:
 a storage device comprising a volatile memory, a non-volatile memory, where the storage device communicates over a communication link information that the storage device is capable of providing a mode of operation to flush data in the volatile memory to the non-volatile memory based on a power condition, wherein the storage device receives power, to flush the data, from two or more capacitors that are external to the storage device; and
 a power management device that sends a message to the storage device to enter the mode of operation;
 wherein the storage device communicates to the power management device, using a communication path from the storage device, information that the storage device is capable of providing the mode of operation to flush data; and
 wherein the power management device receives the information from the storage device and, based on the information from the storage device, sends the message to the storage device to enter the mode of operation.

16. The storage system of claim 15, wherein the storage device further comprises a first connector,
 wherein the storage system further comprises a mid-plane comprising a second connector that receives the first connector and comprises at least one supercap coupled to the second connector.

17. The storage system of claim 16, wherein the power management device further controls a voltage to a connector pin of the first connector based on receiving the information from the storage device.

18. The storage system of claim 15, wherein the storage device comprises a solid-state drive.

19. The storage system of claim 15, wherein the storage device comprises one or more super capacitors.

* * * * *